United States Patent
Zirkel et al.

(10) Patent No.: US 11,586,008 B2
(45) Date of Patent: Feb. 21, 2023

(54) PHOTOGRAPHIC OBJECTIVE

(71) Applicant: Leica Camera AG, Wetzlar (DE)

(72) Inventors: Achim Zirkel, Munich (DE); Jakob Bleicher, Munich (DE); Alexandra Bleicher, Munich (DE)

(73) Assignee: Leica Camera AG, Wetzlar (DE)

( * ) Notice: Subject to any disclaimer, the term of this patent is extended or adjusted under 35 U.S.C. 154(b) by 272 days.

(21) Appl. No.: 16/940,681

(22) Filed: Jul. 28, 2020

(65) Prior Publication Data

US 2021/0041660 A1    Feb. 11, 2021

(30) Foreign Application Priority Data

Aug. 5, 2019 (DE) .......................... 102019121122.0

(51) Int. Cl.
*G02B 9/36* (2006.01)
*G02B 13/18* (2006.01)

(52) U.S. Cl.
CPC .............. *G02B 9/36* (2013.01); *G02B 13/18* (2013.01)

(58) Field of Classification Search
None
See application file for complete search history.

(56) References Cited

U.S. PATENT DOCUMENTS

| | | | |
|---|---|---|---|
| 2,865,252 A * | 12/1958 | Reiss | G02B 13/04 |
| | | | 359/753 |
| 5,050,973 A | 9/1991 | Sakamoto | |
| 6,208,474 B1 * | 3/2001 | Kondo | G02B 13/24 |
| | | | 359/772 |
| 2008/0186594 A1 | 8/2008 | Jeong et al. | |
| 2010/0157442 A1 | 6/2010 | Nakagawa | |
| 2016/0274330 A1 * | 9/2016 | Chiang | G02B 13/004 |
| 2017/0269329 A1 | 9/2017 | Jhang et al. | |
| 2018/0321468 A1 | 11/2018 | Shih et al. | |

FOREIGN PATENT DOCUMENTS

GB    157040 A    1/1921

OTHER PUBLICATIONS

German search report dated Mar. 6, 2020 in corresponding German patent application No. 10 2019 121 122.0 (two pages).

* cited by examiner

*Primary Examiner* — Darryl J Collins
(74) *Attorney, Agent, or Firm* — Kilpatrick Townsend & Stockton LLP

(57) ABSTRACT

The present invention relates to an objective for photographic applications, comprising, in a sequence from an object side end to an image side end, a first lens group having a positive refractivity with at least one lens, a second lens group having a negative refractivity with a single lens, a third lens group having a negative refractivity with a single lens and a fourth lens group having a positive refractivity with at least one lens, wherein the lenses of the second and third lens groups each have a concave surface which face one another and define an air lens, wherein f1 is the overall focal length of the lenses of the second and third lens groups and f2 is the focal length of the air lens, and wherein the relationship $5.0 \leq f1/f2 \leq 9.0$ is true.

15 Claims, 9 Drawing Sheets

PHOTOGRAPHIC OBJECTIVE

Figure 1A:
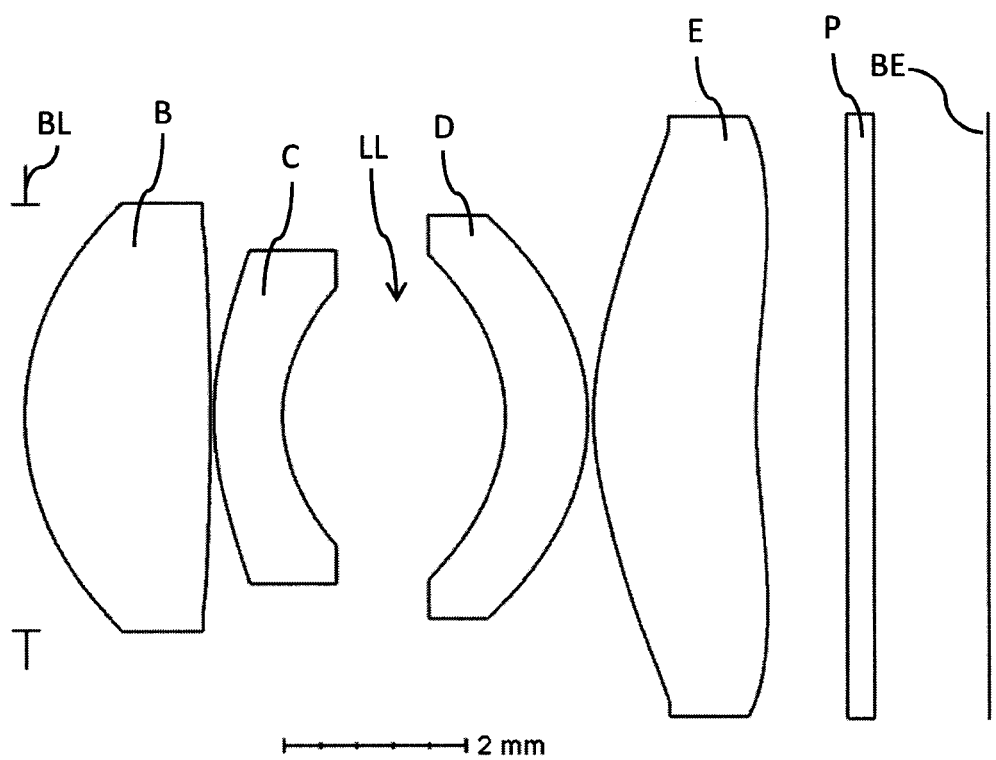

This application claims priority to German Application No. 102019121122.0, filed Aug. 5, 2019, the disclosure of which is incorporated by reference herein.

The present invention relates to an objective for photographic applications, in particular to a normal lens.

Short focal length lenses or wide angle lenses are frequently used for generating still images and/or moving images, in particular for mobile photographic applications, such as for smart phones and other mobile devices capable of recording images. However, these are not always satisfactory for all cases of application with regard to their imaging performance and their image angle. For this reason an objective, in particular a normal lens, should be made available that has a smaller image angle in comparison to a wide angle lens. In this connection a shorter construction length of the objective is striven for albeit the increased focal length required for this, however, with an increased resolution being ensured. The latter can for example be achieved thereby in that seven or more lenses are provided. However, objectives with a high number of lenses frequently have single lenses with very small thicknesses. The lens thickness frequently falls below a measure, in particular at the lens boundaries, which still seems acceptable with regard to manufacture and fracture stability.

Objectives with four lens groups, in which the two outer lens groups have a positive refractivity and the two inner lens groups have a negative refractivity, are known for example from US 2010/157442 A1, US 2018/321468 A1, US 2008/186594 A1, US 2017/269329 A1 and GB 157040 A.

It is an object of the present invention to provide a photographic objective which has a short construction length and a small number of optical components for a high resolution.

This object is satisfied by a photographic objective, respectively lens, having the features of claim 1. The objective in accordance with the invention comprises, in a sequence from an object side end to an image side end, a first lens group having a positive refractivity with at least one lens, a second lens group having a negative refractivity with a single lens, a third lens group having a negative refractivity with a single lens and a fourth lens group having a positive refractivity with at least one lens, wherein the lenses of the second and third lens groups each have a concave surface which face one another and define an air lens, wherein f1 is the overall focal length of the lenses of the second and third lens groups and f2 is the focal length of the air lens, and wherein the relationship 5.0 f1/f2 9.0 is true. The surfaces facing one another of the lenses of the second and third lens groups hence include a biconvex virtual lens or an air lens.

Generally a short construction length can thereby be achieved for objectives in that a first lens group has a very high positive refractivity and further, inner lying lens groups have a high negative refractivity. Typically one or more aspheric lenses are used for such kind of objective constructions in order to correct for image errors which is a prerequisite for achieving high resolutions. In the framework of the present invention it has been shown that a particular importance is hereby placed on the specific design of the negative second and third lens groups. In particular the ratio of the focal lengths of the negative second and third lens groups to the focal length of the air length has been found to be very important. With a corresponding selection of the respectively concerned lenses such that the ratio of the overall focal length of the lenses of the second and the third lens group to the focal length of the air lens satisfying the aforementioned conditions, particularly advantageous effects with regard to a high resolution can be achieved for a short construction length. Preferably the lenses of the second and third lens groups are configured as meniscus lenses.

The photographic objective is preferably a photographic objective with exactly four lens groups. Even if the described embodiments each have exactly four lens groups, it is, however, not excluded that also further lens groups could be present.

The respective lenses of the objective can selectively be made from plastic or from glass, in particular with a combination of plastic lenses and glass lenses being possible.

In accordance with an advantageous embodiment of the invention the first lens group has a single lens or two lenses, and/or the fourth lens group has a single lens or two lenses. The objective defined in this way is thus configured as a four lens system, a five lens system or a six lens system. Already an objective comprising only four lenses can satisfy the object of the invention. Having a higher number of lenses permits the increase in resolution as additional aspheric surfaces can be introduced into the objective that can be used in this context for a further improvement of the imaging quality through additional image error corrections. However, more than six lenses are not necessarily required for achieving an optimized resolution, which has positive implications with regard to the construction length and the manufacturing costs.

In accordance with a further advantageous embodiment of the invention it is provided that the lenses of the second and the third lens groups have a refractive index larger than or equal to 1.6 and an Abbe-number of larger than or equal to 19, and/or in that the lenses of the first and the fourth lens groups have a refractive index of larger than or equal to 1.5 and an Abbe-number of larger than or equal to 55. Such lenses have been found to be advantageous in particular for the correction of chromatic imaging errors.

In accordance with a further advantageous embodiment each lens group, preferably each lens, has at least one aspheric surface, wherein preferably both surfaces are aspheric for at least one of the lenses. Hereby a further contribution is made for improving the imaging quality.

In this connection it has been found to be advantageous if an aperture diaphragm is provided that is arranged in the region of the first aspheric surface when considered from the object side. Thus an objective of the front panel type is realised. The aperture diaphragm is arranged directly in front of the first aspheric surface or surrounds this when considered from the object side.

In accordance with a further advantageous embodiment it is provided that further at least one of the following relationships is true:

$-6.0 \leq fB/f2 \leq -4.0;$ $5.0 \leq fC/f2 \leq 10.0;$ $-3.0 \leq f3/f1 \leq -1.6;$ $10.0 \leq fD/f2 \leq 30.0;$ $1.0 \leq fC/f1 \leq 1.6;$ $-1.2 \leq fB/f1 - 0.80;$ $2.6 \leq fD/f1 \leq 5.0;$ wherein fB is the focal length of the lens directly in front of the second lens group, fC is the focal length of the lens of the second lens group, fD is the focal length of the lens of the third lens group, and f3 is the focal length of the fourth lens group. The mentioned focal length fB is thus the focal length of the one lens of the first lens group, when this has only one lens, or of that lens of the first lens group which is adjacent to the second lens group, when the first lens group has more than one lens, in particular two lenses. The focal length f3 is the focal length of the one lens of the fourth lens group, when this only has one lens or the overall focal length of the plurality of lenses of the fourth lens group when this has more than one lens, in particular two lenses.

In accordance with a further advantageous embodiment of the invention it is provided that further one of the following relationships is true:

$0.585 \leq fB/f \leq 0.635;$ $-1.2 \leq fC/f3 \leq -0.5;$ $0.3 \leq fB/f3 \leq 0.7;$ $0.9 \leq f3/f \leq 2.5;$ $-3.0 \leq Fd/f3 \leq -1.3;$ $0.20 \leq fC/fD \leq 0.62;$ $-1.00 \leq fC/f \leq -0.70;$ $-1.0 \leq fB/fC \leq -0.60;$ wherein fB is the focal length of the lens directly in front of the second lens group, fC is the focal length of the lens of the second lens group, fD is the focal length of the lens of the third lens group, f3 is the focal length of the fourth lens group, and f is the overall focal length of the objective.

In accordance with a further advantageous embodiment of the invention it is further provided that the following relationships $-0.75 \leq f1/f \leq -0.55$ and $-0.2 \leq f2/f \leq -0.08$ are true, wherein f is the overall focal length of the objective.

In accordance with a further advantageous embodiment of the invention it is further provided that further the relationships $-3.00 \leq fD/f \leq -1.50$ and $-3.0 \leq Fd/f3 \leq -1.30$ are true, wherein fD is the focal length of the lens of the third lens group, f3 is the focal length of the lens of the fourth lens group and f is the overall focal length of the objective.

In accordance with a further advantageous embodiment of the invention it is further provided that the relationships $-0.40 \leq fB/gD \leq -0.20$ and $-0.2 \leq f2/f \leq -0.08$ are true, wherein fB is the focal length of the lens directly in front of the second lens group, fD is the focal length of the lens of the third lens group, and f is the overall focal length of the objective.

In accordance with a further advantageous embodiment of the invention it is further provided that the relationships $-15.0 \leq f3/f2 \leq -8.0$ and $-0.2 \leq f2/f \leq -0.08$ are true, wherein f3 is the focal length of the fourth lens group, and f is the overall focal length of the objective.

In accordance with a further advantageous embodiment of the invention it is further provided that the relationship $0.2 \leq d'/f \leq 0.4$ is true, wherein d' is the thickness of the first lens group, and f is the overall focal length of the objective. When the first lens group comprises only a single lens, the size d' is the thickness of this lens, this means the spacing between its apexes. If the first lens group comprises two or also more lenses then the size d' is the spacing from the apex of the lens surface of the first lens at the object side to the apex of the image side lens surface of the final lens of the first lens group.

The half image angle of the objective in the diagonal preferably amounts to 23° or less and preferably lies between 22.6° and 21.4°. The objective can thus be classified as a normal lens with respect to its image angle.

The main beam angle, this means the angle of incidence of the light beams with reference to the perpendicular of the image plane is preferably smaller than or equal to 19°.

The objective preferably has a luminosity of 2.0 or less, particularly preferably of 1.8 or less. Correspondingly the ratio of openings is not more than 1:2.0, preferably not more than 1:1.8.

The mechanical frame diameter of the objective advantageously lies between 9 and 12 mm.

An objective in accordance with one or more of the aforementioned embodiments is in particular characterized by the following advantageous embodiments:

The polychromatic modulation transfer function (MTF) for an infinite focusing of the objective for a test object having 102 line pairs/mm amounts to at least 77% on the axis and to at least 67% over the complete image field.

For a focus range between infinity and 400 mm the polychromatic modulation transfer function for a test object with 102 line pairs/mm still amounts to at least 52% over the complete image field.

Also in the close range of 200 mm object spacing a polychromatic modulation transfer function of at least 70% is still achieved over the complete image field for a test object of 50 line pairs/mm.

The correction of the objective was carried out in such a way that the remaining residual image errors, in particular the comas, achieve a balanced, as good as possible minimum for different object distances between infinity and 200 mm in dependence on the respective focusing. In this way the MTF is maximised for the respective distances.

Further advantageous embodiments of the invention result from the dependent claims, the description and the drawings, with individual features and/or feature groups being able to be combined with one other in a suitable manner—also deviating from the combinations of features explicitly mentioned here.

Figure 2A:
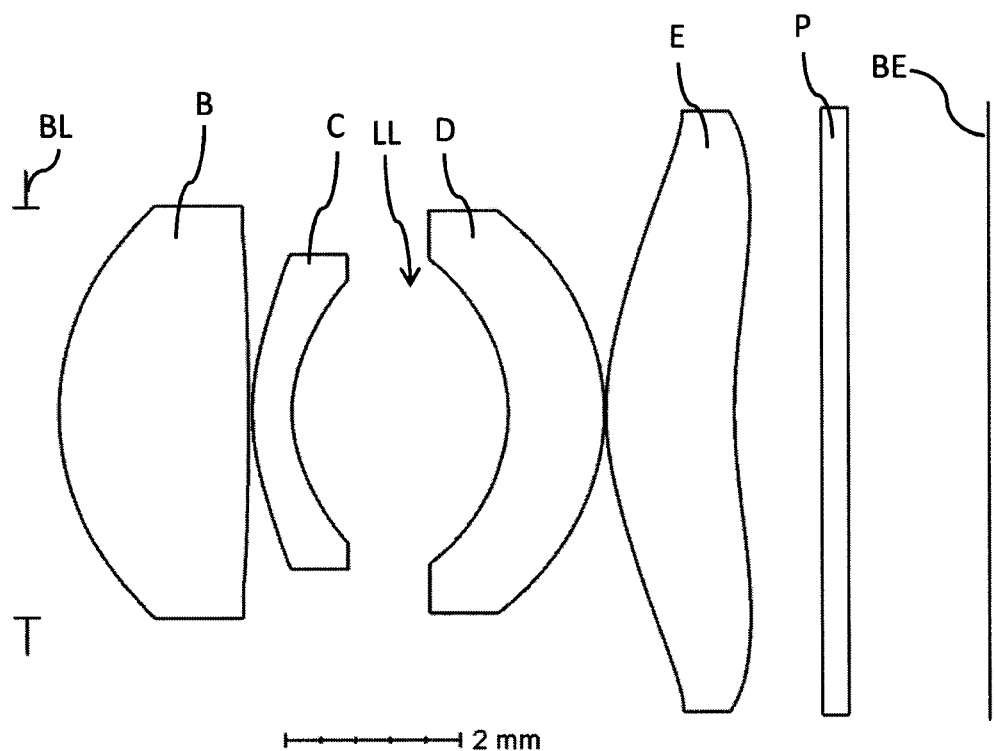
Figure 9:
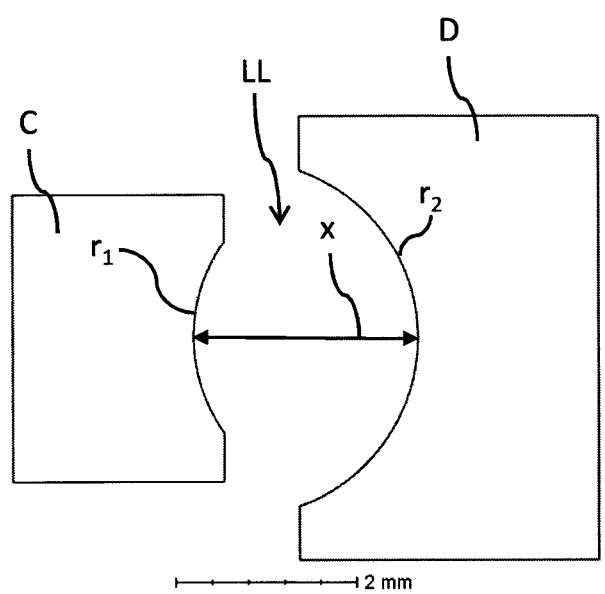

The invention will be described in the following with reference to an embodiment with respect to the drawing. There is shown:

FIGS. 1a and 2a respective lens sections of four lens objectives in accordance with a first and second embodiment of the invention;

FIGS. 3a to 5a respective lens sections of five lens objectives in accordance with a third, fourth and fifth embodiment of the invention;

FIGS. 6a to 8a respective lens sections of six lens objectives in accordance with a sixth, seventh and eighth embodiment of the invention;

FIGS. 1b to 8b respectively associated diagrams of modulation transfer functions of the objectives in accordance with FIG. 1a to 8a; and FIG. 9 an explanatory lens section for calculating the focal length of an air lens.

FIG. 1a to 8a show photographic objectives in accordance with a first to eighth embodiment with four lens groups G1 to G4 that are numbered from an object side end to an image side end in ascending order.

Having regard to all embodiments the first and the fourth lens groups G1, G4 each have a positive refractivity respectively a positive total power and the second and third lens groups G2, G3 respectively have a negative refractivity respectively a negative total power. Furthermore, the second and third lens groups G2, G3 for all embodiments respectively only consist of a single lens C, D each respectively with a negative refractivity. The individual lenses C, D are configured as meniscus lenses and each have a concave surface, with these concave surfaces facing one another and defining or bounding an air lens.

Having regard to the four lens objectives in accordance with the first and second embodiment (FIG. 1a and 2a) the first lens group G1 is made up of a respective single lens B with positive refractivity.

Having regard to the four lens objectives and five lens objectives, the fourth lens group G4 in accordance with the first to fifth embodiment (FIG. 1a to 5a) is made up of a single lens E with positive refractivity.

Having regard to the five lens objectives and six lens objectives in accordance with the third to eighth embodiment (FIGS. 3a to 8a), the first lens group G1 is made up of two individual lenses A, B, which each have a positive refractivity.

Finally the fourth lens group G4 for the six lens objectives in accordance with the sixth to eighth embodiment (FIGS. 6a to 8a) is made up of two individual lenses E, F, which each have a positive refractivity.

A respective aperture diaphragm BL is arranged directly in front of the first lens of the objective from the object side, this means from the object side in front of the first lens group G1.

Furthermore, the respective image plane BE is shown in all Figures. Moreover, a plane parallel plate P is provided between the fourth lens group G4 and the image plane BE as a cover glass. The plane parallel plate P can be configured as a band-elimination filter for non-visible light, UV-light and/or IR led, so that only visible light is let through.

All lenses A to F of the four lens groups G1 to G4 as well as the plane parallel plate P are arranged spaced apart relative to one another with a fixed spacing. Thus all lenses A to F inclusive of the plane parallel plate P are displaced by the same amount and in the same direction for focusing, this means an inner focusing or the like is not provided. On focusing only the spacing between the plane parallel plate P and the image plane BE changes. For example, the spacing between the plane parallel plate P and the image plane BE increases by 430 μm for the second embodiment, when the focusing is reduced from infinity to an object spacing of 200 mm.

Detailed construction data and optical data are provided for the respective embodiments of the objective in accordance with the invention for a focusing up to infinity. The data relates to those surfaces that refer to respective air-glass-transitions respectively to the active surface of the apertures and that are numbered from an object side end to an image side end in ascending order. Thus, surface 1 denotes the active surface of the aperture diaphragm BL, surface 2 denotes the object side surface of the first lens (Lens B for the first and second embodiment in accordance with FIGS. 1a and 2a respectively Lens A for the third to eighth embodiment in accordance with FIGS. 3a to 8a), surface 3 denotes the image side surface of this lens and so forth. The construction data are stated by way of example for focal lengths between 9.10 and 9.30 mm and an image surface (sensor size) of 5.68 mm×4.27 mm and resulting from this for an image diagonal of 7.1 mm for the first embodiment and for an image diagonal of 7.5 mm for the second to eighth embodiment. The difference resulting between the diagonal of the sensor surface (7.1 mm) and the image diagonal (7.5 mm) underlying the construction data in the amount of 0.4 mm for the second to eighth embodiment can be used for alignment purposes respectively for a possible image stabilisation. Naturally the embodiments can also be scaled to larger or smaller image diagonals, image surfaces and/or sensor sizes.

The allocation of the further surface numberings varies with the number of the lenses of the respective embodiments, with the allocation of the individual surfaces to the functional elements of a respective objective resulting from the corresponding tables.

The surfaces of all lenses A to F each have an aspheric curvature. For an arrow height z of a respective single lens surface in parallel to the optical axis at a point with the height h in relation to the optical axis and perpendicular to this, the following aspheric equation (1) is true:

$$z(h) = \frac{h^2/r0}{1+\sqrt{1-(1+k)(h/r0)^2}} + a4 \cdot h^4 + a6 \cdot h^6 + \ldots + a16 \cdot h^{16} \quad (1)$$

with f0 being the apex radius of curvature, k being the conical constant and a4, a6, . . . , a16 being the aspheric coefficients. The respective apex radius of curvature r0, the thickness d respectively the spacing to the next surface along the optical axis, the refractive index n of the respective optical material, the Abbe-number v and the conical constant k are stated in the following tables for the respective embodiments.

In the synoptic tables the respective overall focal length of the objective f, the half image angle α/2 in the diagonal, as well as—as far as applicable for the respective embodiment—different focal lengths are provided for all embodiments that are defined as follows:

fA is the focal length of the lens A;
fB is the focal length of the lens B;
fC is the focal length of the lens C;
fD is the focal length of the lens D;
fF is the focal length of the lens F.
f1 is the overall focal length of the lenses C and D, this means the overall focal length of the second and third lens groups G2, G3;
f2 is the focal length of the air lens LL, with their calculation still being explained in detail in the following; and
f3 is the focal length of the fourth lens group G4, this means the focal length of the lens E or the overall focal length of the lenses E and F.

Furthermore, the synoptic table comprises different ratios of these focal lengths with respect to one another. Finally, also a thickness d' of the first lens group (as previously mentioned), the ratio of the thickness d' to the overall focal length f, as well as the luminosity and/or the focal ratio f/no are stated in the synoptic table.

The calculation of the focal length f2 of an air lens—also referred to hereinafter as $f_{air}$—will be explained in the following with reference to FIG. 9. Generally speaking one differentiates whether the materials of the lenses in front of and behind the air lens have the same refractive index n or different refractive indices n.

If the refractive indices n of both lenses are the same, then the focal length $f'_{air}$ of the air lens LL can be calculated in accordance with the following equation 2 as follows:

$$\frac{1}{f'_{air}} = \left(\frac{n'-n}{n} \cdot \left(\frac{1}{r_1} - \frac{1}{r_2}\right) + \frac{(n'-n)^2 \cdot x}{n' \cdot n \cdot r_1 \cdot r_2}\right) \cdot n, \quad (2)$$

with n being the refractive index of the lenses C, D surrounding the air lens LL, n'=1 being the refractive index of air, $r_1$ being the radius of the rear side of the lens C, $r_2$ being the radius of the front side of the lens D and x being the spacing of the two lenses C, D (this means the thickness of the air lens LL).

For the case that the respective refractive indices n of the lenses C and D deviate from one another, the overall focal length $f'_{air}$ of the air lens LL can generally be calculated from the individual focal lengths of the front lens C and the rear lens D in a manner known per se, with this case however not being applicable to the presented embodiments.

Synoptic table:

| embodiment | Number of lenses | f [mm] | α/2 [°] | fA [mm] | fB [mm] | fC [mm] | f1 [mm] | f2 [mm] | fD [mm] |
|---|---|---|---|---|---|---|---|---|---|
| 1 | 4 | 9.10 | 21.40 | n. a. | 5.64 | −7.13 | −5.83 | −1.05 | −25.29 |
| 2 | 4 | 9.10 | 22.40 | n. a. | 5.58 | −8.12 | −6.06 | −0.99 | −20.44 |
| 3 | 5 | 9.30 | 22.00 | 79.69 | 5.54 | −7.87 | −6.14 | −0.95 | −22.66 |
| 4 | 5 | 9.10 | 22.60 | 38.94 | 5.46 | −7.86 | −6.22 | −1.02 | −22.85 |
| 5 | 5 | 9.10 | 22.40 | 179.48 | 5.39 | −8.94 | −5.75 | −1.09 | −15.01 |
| 6 | 6 | 9.10 | 22.53 | 179.48 | 5.39 | −8.94 | −5.76 | −1.09 | −15.01 |
| 7 | 6 | 9.10 | 22.30 | 179.48 | 5.39 | −8.94 | −5.76 | −1.09 | −15.01 |
| 8 | 6 | 9.10 | 22.40 | 54.39 | 5.68 | −8.58 | −6.60 | −1.11 | −23.05 |

| embodiment | f3 [mm] | fF [mm] | f1/f | f2/f | f1/f2 | fB/f | fC/f | fD/f | f3/f |
|---|---|---|---|---|---|---|---|---|---|
| 1 | 11.06 | n. a. | −0.64 | −0.12 | 5.54 | 0.62 | −0.78 | −2.78 | 1.22 |
| 2 | 11.51 | n. a. | −0.67 | −0.11 | 6.16 | 0.61 | −0.89 | −2.25 | 1.27 |
| 3 | 11.95 | n. a. | −0.66 | −0.10 | 6.48 | 0.60 | −0.85 | −2.44 | 1.29 |
| 4 | 12.37 | n. a. | −0.68 | −0.11 | 6.08 | 0.60 | −0.86 | −2.51 | 1.36 |
| 5 | 10.70 | n. a. | −0.63 | −0.12 | 5.29 | 0.59 | −0.98 | −1.65 | 1.18 |
| 6 | 10.72 | 37.78 | −0.63 | −0.12 | 5.29 | 0.59 | −0.98 | −1.65 | 1.18 |
| 7 | 10.73 | 14.64 | −0.63 | −0.12 | 5.29 | 0.59 | −0.98 | −1.65 | 1.18 |
| 8 | 14.86 | 31.65 | −0.72 | −0.12 | 5.93 | 0.62 | −0.94 | −2.53 | 1.63 |

| embodiment | fB/f1 | fC/f1 | fD/f1 | f3/f1 | fB/fC | fB/fD | fC/fD | fB/f3 | fC/f3 |
|---|---|---|---|---|---|---|---|---|---|
| 1 | −0.97 | 1.22 | 4.34 | −1.90 | −0.79 | −0.22 | 0.28 | 0.51 | −0.64 |
| 2 | −0.92 | 1.34 | 3.37 | −1.90 | −0.69 | −0.27 | 0.40 | 0.48 | −0.71 |
| 3 | −0.90 | 1.28 | 3.69 | −1.95 | −0.70 | −0.24 | 0.35 | 0.46 | −0.66 |
| 4 | −0.88 | 1.26 | 3.68 | −1.99 | −0.69 | −0.24 | 0.34 | 0.44 | −0.64 |
| 5 | −0.94 | 1.55 | 2.61 | −1.86 | −0.60 | −0.36 | 0.60 | 0.50 | −0.84 |
| 6 | −0.94 | 1.55 | 2.61 | −1.86 | −0.60 | −0.36 | 0.60 | 0.50 | −0.83 |
| 7 | −0.94 | 1.55 | 2.61 | −1.86 | −0.60 | −0.36 | 0.60 | 0.50 | −0.83 |
| 8 | −0.86 | 1.30 | 3.49 | −2.25 | −0.66 | −0.25 | 0.37 | 0.38 | −0.58 |

| embodiment | fD/f3 | fB/f2 | fC/f2 | fD/f2 | f3/f2 | d' [mm] | d'/f | f/no |
|---|---|---|---|---|---|---|---|---|
| 1 | −2.29 | −5.36 | 6.78 | 24.04 | −10.52 | 2.04 | 0.22 | 1.8 |
| 2 | −1.77 | −5.66 | 8.24 | 20.75 | −11.69 | 2.17 | 0.24 | 1.8 |
| 3 | −1.90 | −5.84 | 8.31 | 23.93 | −12.62 | 2.16 | 0.23 | 1.87 |
| 4 | −1.85 | −5.34 | 7.69 | 22.35 | −12.11 | 2.61 | 0.29 | 1.8 |
| 5 | −1.40 | −4.95 | 8.22 | 13.79 | −9.83 | 2.15 | 0.24 | 1.8 |
| 6 | −1.40 | −4.95 | 8.22 | 13.79 | −9.85 | 2.15 | 0.24 | 1.8 |
| 7 | −1.40 | −4.95 | 8.22 | 13.79 | −9.86 | 2.15 | 0.24 | 1.8 |
| 8 | −1.55 | −5.11 | 7.71 | 20.72 | −13.36 | 2.16 | 0.24 | 1.8 |

1. Embodiment (4 lenses):

| Surface | Function | r0 [mm] | d [mm] | n | ν | k |
|---|---|---|---|---|---|---|
| 1 | BL | ∞ | −0.009831 | | | |
| 2 | B | 3.37384 | 2.042725 | 1.5346 | 56.1 | −6.013807E−02 |
| 3 | | −23.36833 | 0.040000 | | | 0.000000E+00 |
| 4 | C | 3.76742 | 0.754033 | 1.6613 | 20.4 | 7.867543E−01 |
| 5 | | 1.93625 | 2.460709 | | | 0.000000E+00 |
| 6 | D | −2.04521 | 0.904241 | 1.6613 | 20.4 | 0.000000E+00 |
| 7 | | −2.73878 | 0.062453 | | | 1.599860E−01 |
| 8 | E | 3.72239 | 1.792194 | 1.5346 | 56.1 | 0.000000E+00 |
| 9 | | 8.28149 | 1.000000 | | | 0.000000E+00 |
| 10 | P | ∞ | 0.300000 | 1.5233 | 54.5 | |
| 11 | | ∞ | 1.260694 | | | |
| 12 | BE | ∞ | | | | |

-continued

| Surface | a4 | a6 | a8 | a10 |
|---|---|---|---|---|
| 1 | | | | |
| 2 | 7.427903E−04 | −6.102988E−04 | 3.352514E−04 | −1.090150E−04 |
| 3 | 4.889461E−03 | −3.998912E−04 | −2.763395E−04 | 7.757747E−05 |
| 4 | −1.370340E−02 | 1.052272E−03 | −1.913926E−04 | −2.062649E−04 |
| 5 | −2.373537E−02 | −5.035534E−03 | 9.304380E−03 | −8.392384E−03 |
| 6 | 3.649228E−02 | −1.330194E−02 | 7.511239E−03 | −3.734898E−03 |
| 7 | 7.847413E−03 | −3.622681E−03 | 2.659947E−03 | −1.048801E−03 |
| 8 | −2.210621E−02 | 4.030699E−03 | −6.557425E−04 | 7.858843E−05 |
| 9 | −9.164586E−03 | 4.116773E−04 | −1.580634E−05 | 5.571770E−06 |
| 10 | | | | |
| 11 | | | | |
| 12 | | | | |

| Surface | a12 | a14 | a16 |
|---|---|---|---|
| 1 | | | |
| 2 | 1.922415E−05 | −1.788839E−06 | 5.938919E−08 |
| 3 | −8.401680E−06 | −4.757129E−08 | 5.108595E−08 |
| 4 | 1.047734E−04 | −2.088126E−05 | 1.708327E−06 |
| 5 | 4.004154E−03 | −1.050755E−03 | 1.190738E−04 |
| 6 | 1.699088E−03 | −4.351277E−04 | 4.592261E−05 |
| 7 | 2.772417E−04 | −4.066971E−05 | 2.490350E−06 |
| 8 | −6.790142E−06 | 3.488990E−07 | −8.045156E−09 |
| 9 | −9.149867E−07 | 5.419256E−08 | −1.120998E−09 |
| 10 | | | |
| 11 | | | |
| 12 | | | |

2. Embodiment (4 lenses):

| Surface | Function | r0 [mm] | d [mm] | n | ν | k |
|---|---|---|---|---|---|---|
| 1 | BL | ∞ | 0.372300 | | | |
| 2 | B | 3.29531 | 2.168079 | 1.5346 | 56.072 | −1.772641E−01 |
| 3 | | −25.36757 | 0.040000 | | | −6.619536E+02 |
| 4 | C | 3.00721 | 0.452311 | 1.6613 | 20.373 | −3.820321E+00 |
| 5 | | 1.81897 | 2.476800 | | | −9.926985E−02 |
| 6 | D | −1.97282 | 1.092728 | 1.6613 | 20.373 | 0.000000E+00 |
| 7 | | −2.81741 | 0.020000 | | | 1.764451E−01 |
| 8 | E | 3.56661 | 1.469203 | 1.5445 | 56.003 | −1.634535E−01 |
| 9 | | 7.02860 | 1.000000 | | | 0.000000E+00 |
| 10 | P | ∞ | 0.300000 | 1.5233 | 54.517 | |
| 11 | | ∞ | 1.610695 | | | |
| 12 | BE | ∞ | | | | |

| Surface | a4 | a6 | a8 | a10 |
|---|---|---|---|---|
| 1 | | | | |
| 2 | 1.008864E−03 | −5.236820E−04 | 3.435479E−04 | −1.336669E−04 |
| 3 | 5.180768E−03 | −2.716738E−03 | 4.816223E−04 | −5.870800E−06 |
| 4 | −4.367935E−03 | −7.168297E−04 | 2.304301E−05 | −1.306931E−04 |
| 5 | −4.117277E−02 | 1.272047E−03 | 4.044707E−03 | −5.664973E−03 |
| 6 | 3.496517E−02 | −1.337774E−02 | 1.115373E−02 | −8.121355E−03 |
| 7 | 7.141177E−03 | −2.599791E−03 | 1.841827E−03 | −7.609784E−04 |
| 8 | −1.959791E−02 | 2.868575E−03 | −4.576778E−04 | 6.132848E−05 |
| 9 | −9.664108E−03 | 6.648955E−04 | −1.229603E−04 | 2.638063E−05 |
| 10 | | | | |
| 11 | | | | |
| 12 | | | | |

| Surface | a12 | a14 | a16 |
|---|---|---|---|
| 1 | | | |
| 2 | 2.831365E−05 | −3.255829E−06 | 1.504651E−07 |
| 3 | −1.742772E−05 | 3.091550E−06 | −1.453691E−07 |
| 4 | 1.341386E−04 | −3.755232E−05 | 3.942786E−06 |
| 5 | 3.151349E−03 | −8.829275E−04 | 9.995915E−05 |
| 6 | 3.939072E−03 | −9.900014E−04 | 1.014314E−04 |
| 7 | 2.021992E−04 | −2.863185E−05 | 1.667585E−06 |
| 8 | −5.896811E−06 | 3.162844E−07 | −7.140676E−09 |
| 9 | −3.019834E−06 | 1.621963E−07 | −3.356266E−09 |
| 10 | | | |
| 11 | | | |
| 12 | | | |

-continued

| 3. Embodiment (5 lenses): | | | | | | |
|---|---|---|---|---|---|---|
| Surface | Function | r0 [mm] | d [mm] | n | ν | k |
| 1 | BL | ∞ | −0.032074 | | | |
| 2 | A | 3.06168 | 0.671653 | 1.5311 | 55.754 | −2.613714E−01 |
| 3 | | 3.04717 | 0.099067 | | | −1.856999E−01 |
| 4 | B | 3.20327 | 1.392801 | 1.5346 | 56.072 | −1.042416E−01 |
| 5 | | −35.24582 | 0.096086 | | | −1.450385E+03 |
| 6 | C | 2.84364 | 0.416255 | 1.6613 | 20.373 | −3.921216E+00 |
| 7 | | 1.73770 | 2.526017 | | | −1.307173E−01 |
| 8 | D | −1.96783 | 1.082768 | 1.6613 | 20.373 | 0.000000E+00 |
| 9 | | −2.76009 | 0.033311 | | | 1.437646E+00 |
| 10 | E | 3.69958 | 1.325470 | 1.5445 | 56.003 | −9.809297E−02 |
| 11 | | 7.44374 | 1.000000 | | | 0.000000E+00 |
| 12 | P | ∞ | 0.300000 | 1.5233 | 54.517 | |
| 13 | | ∞ | 1.815214 | | | |
| 14 | BE | ∞ | | | | |

| Surface | a4 | a6 | a8 | a10 |
|---|---|---|---|---|
| 1 | | | | |
| 2 | −1.009963E−03 | −9.840492E−05 | −2.349900E−06 | 5.214303E−06 |
| 3 | −3.663361E−03 | −4.464754E−04 | 1.529494E−05 | −4.891730E−06 |
| 4 | 8.248616E−04 | −4.2437 62E−04 | 2.722177E−04 | −1.406236E−04 |
| 5 | 1.173842E−02 | −3.782378E−03 | 6.178151E−04 | −1.510008E−05 |
| 6 | −5.864932E−03 | −8.024457E−04 | 1.719538E−04 | −1.375137E−04 |
| 7 | −5.160252E−02 | 4.912416E−03 | 1.840451E−03 | −3.962285E−03 |
| 8 | 3.409448E−02 | −1.630486E−02 | 1.442965E−02 | −9.593469E−03 |
| 9 | 6.962133E−03 | −2.459884E−03 | 1.774198E−03 | −7.095158E−04 |
| 10 | −1.859034E−02 | 2.780260E−03 | −4.317348E−04 | 5.605669E−05 |
| 11 | −1.004731E−02 | 8.298777E−04 | −1.322982E−04 | 2.569162E−05 |
| 12 | | | | |
| 13 | | | | |
| 14 | | | | |

| Surface | a12 | a14 | a16 |
|---|---|---|---|
| 1 | | | |
| 2 | −2.449391E−07 | −1.213494E−07 | 9.640086E−09 |
| 3 | −1.103728E−06 | −4.596134E−08 | −1.184924E−08 |
| 4 | 2.871605E−05 | −3.309140E−06 | 7.797128E−08 |
| 5 | −2.208895E−05 | 4.632752E−06 | −3.498186E−07 |
| 6 | 1.344287E−04 | −3.203608E−05 | 2.535909E−06 |
| 7 | 2.246694E−03 | −5.880200E−04 | 5.712305E−05 |
| 8 | 4.254288E−03 | −1.007985E−03 | 1.002067E−04 |
| 9 | 1.860493E−04 | −2.620727E−05 | 1.536231E−06 |
| 10 | −5.238291E−06 | 2.792501E−07 | −6.410713E−09 |
| 11 | −2.826354E−06 | 1.533671E−07 | −3.330365E−09 |
| 12 | | | |
| 13 | | | |
| 14 | | | |

| 4. Embodiment (5 Lenses): | | | | | | |
|---|---|---|---|---|---|---|
| Surface | Function | r0 [mm] | d [mm] | n | ν | k |
| 1 | BL | ∞ | −0.025469 | | | |
| 2 | A | 3.03762 | 1.133829 | 1.5346 | 56.072 | −1.422327E−01 |
| 3 | | 3.08986 | 0.430553 | | | −1.428179E + 00 |
| 4 | B | 2.69263 | 1.042704 | 1.5346 | 56.072 | −3.746865E−01 |
| 5 | | 28.59424 | 0.072493 | | | −4.983488E+01 |
| 6 | C | 3.06272 | 0.333691 | 1.6613 | 20.373 | −5.286734E+00 |
| 7 | | 1.85077 | 2.289941 | | | −8.593145E−02 |
| 8 | D | −1.98138 | 1.153170 | 1.6613 | 20.373 | 0.000000E+00 |
| 9 | | −2.80759 | 0.029744 | | | 7.538373E−02 |
| 10 | E | 3.72408 | 1.424907 | 1.5445 | 56.003 | −9.419436E−02 |
| 11 | | 7.16347 | 1.000000 | | | 0.000000E+00 |
| 12 | P | ∞ | 0.300000 | 1.5233 | 54.517 | |
| 13 | | ∞ | 1.504082 | | | |
| 14 | BE | ∞ | | | | |

| Surface | a4 | a6 | a8 | a10 |
|---|---|---|---|---|
| 1 | | | | |
| 2 | −2.533148E−03 | −1.963629E−04 | −4.478323E−06 | −5.377596E−06 |
| 3 | −1.080665E−02 | 6.028609E−04 | −3.785770E−04 | 4.187044E−05 |
| 4 | −7.499137E−03 | 5.919894E−04 | 3.314899E−04 | −2.851408E−04 |
| 5 | 2.041503E−02 | −6.774083E−03 | 1.777857E−03 | −3.568779E−04 |

-continued

| | | | | |
|---|---|---|---|---|
| 6 | −4.063597E−03 | −2.348859E−03 | −1.255288E−03 | 2.713093E−04 |
| 7 | −4.931261E−02 | 3.923692E−03 | 1.330831E−03 | −4.548225E−03 |
| 8 | 3.178390E−02 | −1.524485E−02 | 1.262016E−02 | −8.594394E−03 |
| 9 | 5.972042E−03 | −2.846095E−03 | 1.745469E−03 | −6.669686E−04 |
| 10 | −1.746943E−02 | 2.464473E−03 | −3.816760E−04 | 5.053590E−05 |
| 11 | −9.724857E−03 | 7.915163E−04 | −1.317773E−04 | 2.531722E−05 |
| 12 | | | | |
| 13 | | | | |
| 14 | | | | |

| Surface | a12 | a14 | a16 |
|---|---|---|---|
| 1 | | | |
| 2 | −1.991485E−06 | 3.922803E−07 | −4.058310E−08 |
| 3 | 1.933840E−06 | −9.495461E−07 | 6.375686E−08 |
| 4 | 6.551242E−05 | −1.180608E−06 | −6.460621E−07 |
| 5 | 4.329745E−05 | 2.484828E−05 | −5.993794E−06 |
| 6 | 3.682531E−04 | −1.265734E−04 | 1.069440E−05 |
| 7 | 3.100778E−03 | −8.790775E−04 | 9.012596E−05 |
| 8 | 3.941240E−03 | −9.748756E−04 | 1.012592E−04 |
| 9 | 1.626811E−04 | −2.171588E−05 | 1.211295E−06 |
| 10 | −4.913440E−06 | 2.711380E−07 | −6.438671E−09 |
| 11 | −2.818062E−06 | 1.534756E−07 | −3.349062E−09 |
| 12 | | | |
| 13 | | | |
| 14 | | | |

5. Embodiment (5 lenses):

| Surface | Function | r0 [mm] | d [mm] | n | ν | k |
|---|---|---|---|---|---|---|
| 1 | BL | ∞ | −0.063611 | | | |
| 2 | A | 3.72382 | 0.723057 | 1.5346 | 56.072 | 0.000000E+00 |
| 3 | | 3.61051 | 0.091257 | | | 0.000000E+00 |
| 4 | B | 2.58953 | 1.332647 | 1.5346 | 56.072 | 0.000000E+00 |
| 5 | | 20.02594 | 0.024853 | | | 0.000000E+00 |
| 6 | C | 2.66451 | 0.398586 | 1.6613 | 20.373 | 0.000000E+00 |
| 7 | | 1.73268 | 1.899313 | | | 0.000000E+00 |
| 8 | D | −2.17560 | 1.111494 | 1.6613 | 20.373 | −1.090308E+00 |
| 9 | | −3.34639 | 0.760049 | | | 0.000000E+00 |
| 10 | E | 3.82755 | 1.693425 | 1.5445 | 56.003 | 0.000000E+00 |
| 11 | | 9.34281 | 1.000000 | | | 0.000000E+00 |
| 12 | P | ∞ | 0.300000 | 1.5233 | 54.517 | |
| 13 | | ∞ | 1.443267 | | | |
| 14 | BE | ∞ | | | | |

| Surface | a4 | a6 | a8 | a10 |
|---|---|---|---|---|
| 1 | | | | |
| 2 | −2.799609E−04 | −2.073454E−05 | 2.501300E−05 | −3.924243E−06 |
| 3 | −1.389318E−02 | 1.054512E−03 | −3.579325E−05 | 7.208304E−06 |
| 4 | −1.051945E−02 | 9.554585E−05 | 1.228236E−04 | −1.275634E−04 |
| 5 | 1.260464E−02 | −6.260270E−03 | 1.646978E−03 | −8.058848E−05 |
| 6 | −3.022930E−02 | 2.241917E−03 | −4.361763E−04 | 8.145777E−04 |
| 7 | −5.096768E−02 | 7.246657E−03 | −3.402897E−03 | 2.200398E−03 |
| 8 | −1.739983E−02 | 7.147858E−03 | −7.432437E−03 | 6.613321E−03 |
| 9 | −1.860822E−02 | 7.688987E−03 | −1.626403E−03 | 2.276332E−04 |
| 10 | −2.771754E−02 | 6.552326E−03 | −1.234449E−03 | 1.564494E−04 |
| 11 | −1.247719E−02 | 1.173564E−03 | −5.256510E−05 | −5.909779E−06 |
| 12 | | | | |
| 13 | | | | |
| 14 | | | | |

| Surface | a12 | a14 | a16 |
|---|---|---|---|
| 1 | | | |
| 2 | 6.959778E−07 | 0.000000E+00 | 0.000000E+00 |
| 3 | −6.415371E−07 | 0.000000E+00 | 0.000000E+00 |
| 4 | 3.707807E−05 | −4.929492E−06 | 9.139056E−08 |
| 5 | −9.187355E−05 | 2.110532E−05 | −1.391976E−06 |
| 6 | −4.261410E−04 | 7.835512E−05 | −4.255136E−06 |
| 7 | −1.721908E−03 | 6.166118E−04 | −1.053438E−04 |
| 8 | −3.582503E−03 | 1.028333E−03 | −1.258109E−04 |
| 9 | −1.236003E−05 | −7.709845E−07 | 0.000000E+00 |
| 10 | −1.269511E−05 | 5.874298E−07 | −1.204611E−08 |
| 11 | 1.178313E−06 | −7.308493E−08 | 1.478161E−09 |

-continued

| | |
|---|---|
| 12 | |
| 13 | |
| 14 | |

| 6. Embodiment (6 lenses): | | | | | | |
|---|---|---|---|---|---|---|
| Surface | Function | r0 [mm] | d [mm] | n | ν | k |
| 1 | BL | ∞ | −0.063611 | | | |
| 2 | A | 3.72382 | 0.723057 | 1.5346 | 56.072 | 0.000000E+00 |
| 3 | | 3.61051 | 0.093610 | | | 0.000000E+00 |
| 4 | B | 2.58953 | 1.332647 | 1.5346 | 56.072 | 0.000000E+00 |
| 5 | | 20.02594 | 0.025386 | | | 0.000000E+00 |
| 6 | C | 2.66451 | 0.398586 | 1.6613 | 20.373 | 0.000000E+00 |
| 7 | | 1.73268 | 1.898059 | | | 0.000000E+00 |
| 8 | D | −2.17560 | 1.111494 | 1.6613 | 20.373 | −1.090308E+00 |
| 9 | | −3.34639 | 0.710997 | | | 0.000000E+00 |
| 10 | E | 3.979735 | 1.0135736 | 1.5449 | 55.93 | 0.000000E+00 |
| 11 | | 7.072152 | 0.1780151 | | | 0.000000E+00 |
| 12 | F | 5.812562 | 0.8012942 | 1.5346 | 56.072 | 0.000000E+00 |
| 13 | | 7.751927 | 1.000000 | | | 0.000000E+00 |
| 14 | P | ∞ | 0.300000 | 1.5233 | 54.517 | |
| 15 | | ∞ | 1.2155759 | | | |
| 16 | BE | ∞ | | | | |

| Surface | a4 | a6 | a8 | a10 |
|---|---|---|---|---|
| 1 | | | | |
| 2 | −2.799609E−04 | −2.073454E−05 | 2.501300E−05 | −3.924243E−06 |
| 3 | −1.389318E−02 | 1.054512E−03 | −3.579325E−05 | 7.208304E−06 |
| 4 | −1.051945E−02 | 9.554585E−05 | 1.228236E−04 | −1.275634E−04 |
| 5 | 1.260464E−02 | −6.260270E−03 | 1.646978E−03 | −8.058848E−05 |
| 6 | −3.022930E−02 | 2.241917E−03 | −4.361763E−04 | 8.145777E−04 |
| 7 | −5.096768E−02 | 7.246657E−03 | −3.402897E−03 | 2.200398E−03 |
| 8 | −1.739983E−02 | 7.147858E−03 | −7.432437E−03 | 6.613321E−03 |
| 9 | −1.860822E−02 | 7.688987E−03 | −1.626403E−03 | 2.276332E−04 |
| 10 | −2.703760E−02 | 6.577410E−03 | −1.349053E−03 | 1.811394E−04 |
| 11 | −8.832103E−03 | −3.750079E−05 | 2.549518E−05 | −5.470449E−06 |
| 12 | −8.602853E−03 | 1.848746E−04 | 1.988860E−05 | −2.745395E−08 |
| 13 | −1.150952E−02 | 9.624745E−04 | −1.719231E−05 | −3.055445E−06 |
| 14 | | | | |
| 15 | | | | |
| 16 | | | | |

| Surface | a12 | a14 | a16 |
|---|---|---|---|
| 1 | | | |
| 2 | 6.959778E−07 | 0.000000E+00 | 0.000000E+00 |
| 3 | −6.415371E−07 | 0.000000E+00 | 0.000000E+00 |
| 4 | 3.707807E−05 | −4.929492E−06 | 9.139056E−08 |
| 5 | −9.187355E−05 | 2.110532E−05 | −1.391976E−06 |
| 6 | −4.261410E−04 | 7.835512E−05 | −4.255136E−06 |
| 7 | −1.721908E−03 | 6.166118E−04 | −1.053438E−04 |
| 8 | −3.582503E−03 | 1.028333E−03 | −1.258109E−04 |
| 9 | −1.236003E−05 | −7.709845E−07 | 0.000000E+00 |
| 10 | −1.522245E−05 | 7.152846E−07 | −1.431154E−08 |
| 11 | 1.140708E−06 | −9.223516E−08 | 2.590326E−09 |
| 12 | −3.352714E−08 | 1.093154E−09 | −1.118480E−10 |
| 13 | 1.454277E−07 | 8.636381E−09 | −5.734187E−10 |
| 14 | | | |
| 15 | | | |
| 16 | | | |

| 7. Embodiment (6 lenses): | | | | | | |
|---|---|---|---|---|---|---|
| Surface | Function | r0 [nun] | d [nun] | n | ν | k |
| 1 | BL | ∞ | −0.063611 | | | |
| 2 | A | 3.72382 | 0.723057 | 1.5346 | 56.072 | 0.000000E+00 |
| 3 | | 3.61051 | 0.088719 | | | 0.000000E+00 |
| 4 | B | 2.58953 | 1.332647 | 1.5346 | 56.072 | 0.000000E+00 |
| 5 | | 20.02594 | 0.026187 | | | 0.000000E+00 |
| 6 | C | 2.66451 | 0.398586 | 1.6613 | 20.373 | 0.000000E+00 |
| 7 | | 1.73268 | 1.8948511 | | | 0.000000E+00 |
| 8 | D | −2.17560 | 1.111494 | 1.6613 | 20.373 | −1.090308E+00 |
| 9 | | −3.34639 | 0.6301421 | | | 0.000000E+00 |
| 10 | E | 4.333876 | 1.1105933 | 1.5449 | 55.93 | 0.000000E+00 |
| 11 | | 5.172498 | 0.1320971 | | | 0.000000E+00 |
| 12 | F | 3.641225 | 0.7398669 | 1.5445 | 55.987 | 0.000000E+00 |

-continued

| | | | | | | |
|---|---|---|---|---|---|---|
| 13 | | 6.200881 | 1.000000 | | | 0.000000E+00 |
| 14 | P | ∞ | 0.300000 | 1.5233 | 54.517 | |
| 15 | | ∞ | 1.3025047 | | | |
| 16 | BE | ∞ | | | | |

| Surface | a4 | a6 | a8 | a10 |
|---|---|---|---|---|
| 1 | | | | |
| 2 | −2.799609E−04 | −2.073454E−05 | 2.501300E−05 | −3.924243E−06 |
| 3 | −1.389318E−02 | 1.054512E−03 | −3.579325E−05 | 7.208304E−06 |
| 4 | −1.051945E−02 | 9.554585E−05 | 1.228236E−04 | −1.275634E−04 |
| 5 | 1.260464E−02 | −6.260270E−03 | 1.646978E−03 | −8.058848E−05 |
| 6 | −3.022930E−02 | 2.241917E−03 | −4.361763E−04 | 8.145777E−04 |
| 7 | −5.096768E−02 | 7.246657E−03 | −3.402897E−03 | 2.200398E−03 |
| 8 | −1.739983E−02 | 7.147858E−03 | −7.432437E−03 | 6.613321E−03 |
| 9 | −1.860822E−02 | 7.688987E−03 | −1.626403E−03 | 2.276332E−04 |
| 10 | −2.239236E−02 | 6.039870E−03 | −1.261331E−03 | 1.716791E−04 |
| 11 | −1.638631E−02 | 2.126213E−03 | −2.065270E−04 | 3.500213E−06 |
| 12 | −2.985335E−02 | 4.422354E−03 | −7.969883E−04 | 1.213047E−04 |
| 13 | −1.941353E−02 | 1.652141E−03 | −7.749177E−05 | −3.229891E−06 |
| 14 | | | | |
| 15 | | | | |
| 16 | | | | |

| Surface | a12 | a14 | a16 |
|---|---|---|---|
| 1 | | | |
| 2 | 6.959778E−07 | 0.000000E+00 | 0.000000E+00 |
| 3 | −6.415371E−07 | 0.000000E+00 | 0.000000E+00 |
| 4 | 3.707807E−05 | −4.929492E−06 | 9.139056E−08 |
| 5 | −9.187355E−05 | 2.110532E−05 | −1.391976E−06 |
| 6 | −4.261410E−04 | 7.835512E−05 | −4.255136E−06 |
| 7 | −1.721908E−03 | 6.166118E−04 | −1.053438E−04 |
| 8 | −3.582503E−03 | 1.028333E−03 | −1.258109E−04 |
| 9 | −1.236003E−05 | −7.709845E−07 | 0.000000E+00 |
| 10 | −1.448569E−05 | 6.702554E−07 | −1.279777E−08 |
| 11 | 8.835247E−07 | −1.135934E−07 | 5.174242E−09 |
| 12 | −1.301630E−05 | 7.378434E−07 | −1.660985E−08 |
| 13 | 1.067745E−06 | −8.892478E−08 | 2.396666E−09 |
| 14 | | | |
| 15 | | | |
| 16 | | | |

| 8. Embodiment (6 lenses): | | | | | | |
|---|---|---|---|---|---|---|
| Surface | Function | r0 [mm] | d [mm] | n | ν | k |
| 1 | BL | ∞ | −0.058975 | | | |
| 2 | A | 3.61163 | 0.844115 | 1.5346 | 56.072 | 0.000000E+00 |
| 3 | | 3.78423 | 0.160688 | | | 0.000000E+00 |
| 4 | B | 2.64370 | 1.158613 | 1.535 | 55.711 | 0.000000E+00 |
| 5 | | 16.65800 | 0.058839 | | | 0.000000E+00 |
| 6 | C | 2.73234 | 0.415371 | 1.6707 | 19.238 | 0.000000E+00 |
| 7 | | 1.74543 | 2.0148205 | | | 0.000000E+00 |
| 8 | D | −2.33894 | 1.1203893 | 1.6613 | 20.373 | −1.090308E+00 |
| 9 | | −3.28669 | 0.5057684 | | | 0.000000E+00 |
| 10 | E | 3.996956 | 1.3140529 | 1.5449 | 55.93 | 0.000000E+00 |
| 11 | | 4.92634 | 0.8372967 | | | 0.000000E+00 |
| 12 | F | 4.306042 | 0.6578826 | 1.5445 | 55.987 | 0.000000E+00 |
| 13 | | 5.422492 | 1.000000 | | | 0.000000E+00 |
| 14 | P | ∞ | 0.300000 | 1.5233 | 54.517 | |
| 15 | | ∞ | 0.283934 | | | |
| 16 | BE | ∞ | | | | |

| Surface | a4 | a6 | a8 | a10 |
|---|---|---|---|---|
| 1 | | | | |
| 2 | −1.307801E−03 | −7.345682E−05 | 1.422082E−05 | −9.859128E−06 |
| 3 | −1.583497E−02 | 7.950922E−04 | −1.091070E−04 | 9.792717E−06 |
| 4 | −1.047618E−02 | −2.049607E−04 | 6.348732E−05 | −1.143434E−04 |
| 5 | 1.557890E−02 | −6.139837E−03 | 1.507478E−03 | −7.955575E−05 |
| 6 | −2.640530E−02 | 1.349366E−03 | −4.291037E−04 | 8.663594E−04 |
| 7 | −4.891389E−02 | 4.956546E−03 | −3.520310E−03 | 3.080689E−03 |
| 8 | −1.290485E−02 | 4.331742E−03 | −8.160107E−03 | 7.046477E−03 |
| 9 | −1.319681E−02 | 5.566443E−03 | −1.382603E−03 | 2.331870E−04 |
| 10 | −2.518827E−02 | 5.705937E−03 | −1.214492E−03 | 1.738966E−04 |
| 11 | −1.825739E−02 | 9.931525E−04 | −3.238557E−05 | −8.101061E−06 |
| 12 | −1.748142E−02 | 4.870681E−04 | 8.326612E−06 | 4.224650E−07 |
| 13 | −1.715188E−02 | 6.852257E−04 | 4.768317E−05 | −5.613308E−06 |

-continued

| Surface | | | |
|---|---|---|---|
| 14 | | | |
| 15 | | | |
| 16 | | | |

| Surface | a12 | a14 | a16 |
|---|---|---|---|
| 1 | | | |
| 2 | 6.058958E−08 | 1.982562E−07 | −2.268086E−08 |
| 3 | −1.479613E−07 | −5.216013E−08 | −2.692389E−09 |
| 4 | 3.240239E−05 | −4.904816E−06 | 2.172589E−07 |
| 5 | −9.454244E−05 | 2.279429E−05 | −1.562755E−06 |
| 6 | −4.195850E−04 | 7.627423E−05 | −4.537407E−06 |
| 7 | −2.422375E−03 | 8.730740E−04 | −1.416038E−04 |
| 8 | −3.438684E−03 | 8.517424E−04 | −8.858916E−05 |
| 9 | −1.988600E−05 | −5.953111E−07 | 1.393403E−07 |
| 10 | −1.566471E−05 | 7.412955E−07 | −1.360344E−08 |
| 11 | 1.484519E−06 | −1.184504E−07 | 3.553897E−09 |
| 12 | −2.168908E−08 | 7.207123E−10 | −1.271309E−10 |
| 13 | 1.116297E−07 | 1.382431E−08 | −6.599717E−10 |
| 14 | | | |
| 15 | | | |
| 16 | | | |

FIGS. 1b to 8b respectively illustrate calculated modulation transfer functions (MTF) for the eight embodiments for two different test objects and a wavelength range of 436.0 nm to 643.8 nm. The contrast and the modulation are respectively applied in the diagrams over the image height in mm (3.55 mm for the 1. embodiment and 3.75 mm for the 2. to 8. embodiment; each corresponding to half the image diagonal), wherein the upper line pair illustrates the MTF for a test object with 50 line pairs/mm and the lower line pair illustrates the MTF for a test object with 102 line pairs/mm. In each line pair the curve designated with S represents the MTF for sagittal structures, whereas the curve designated with T represents the MTF for tangential structures in each line pair.

Figure 1B:
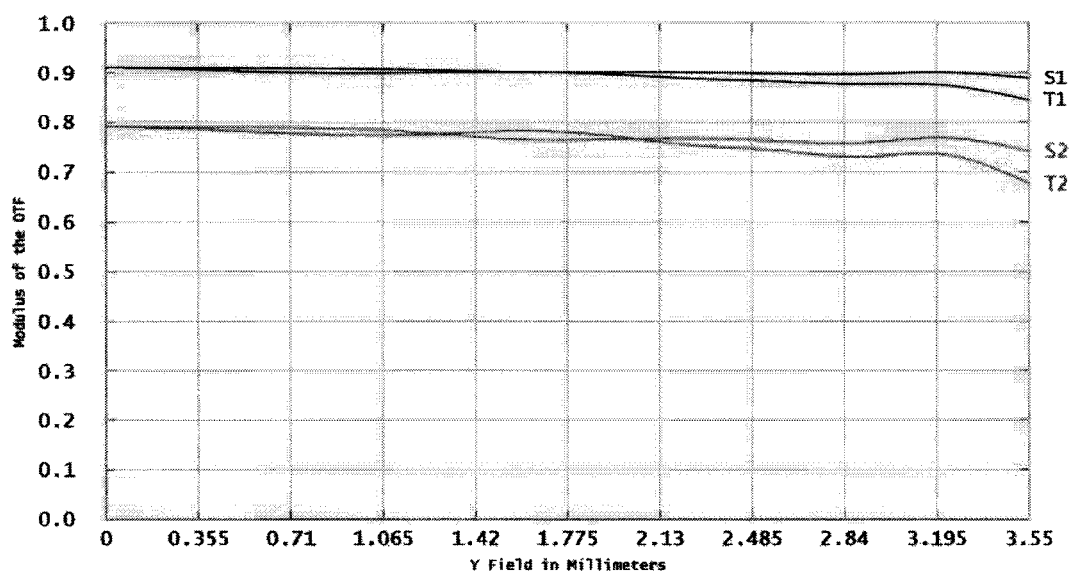
Figure 2B:
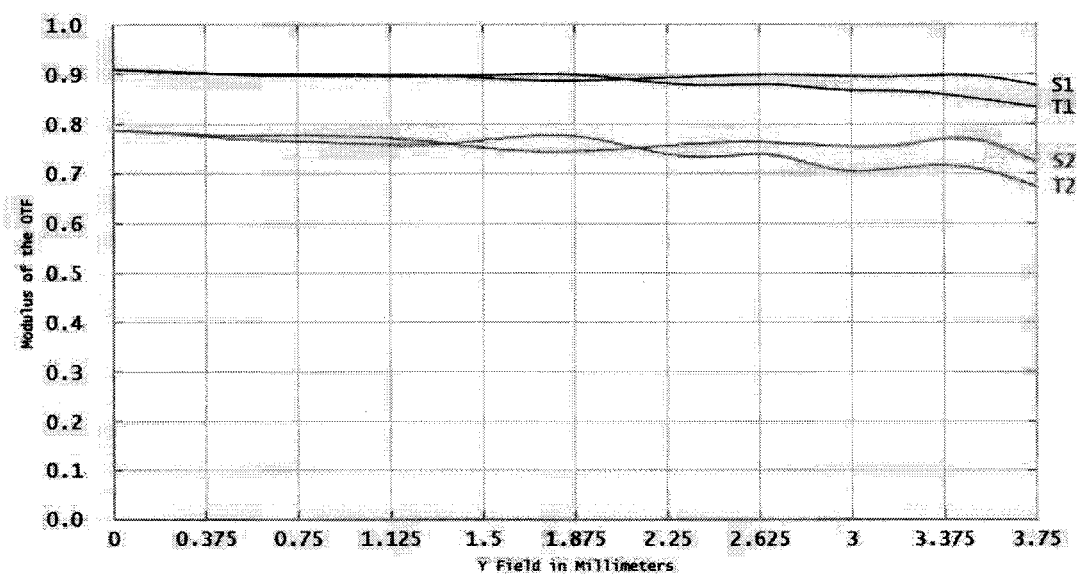
Figure 3A:
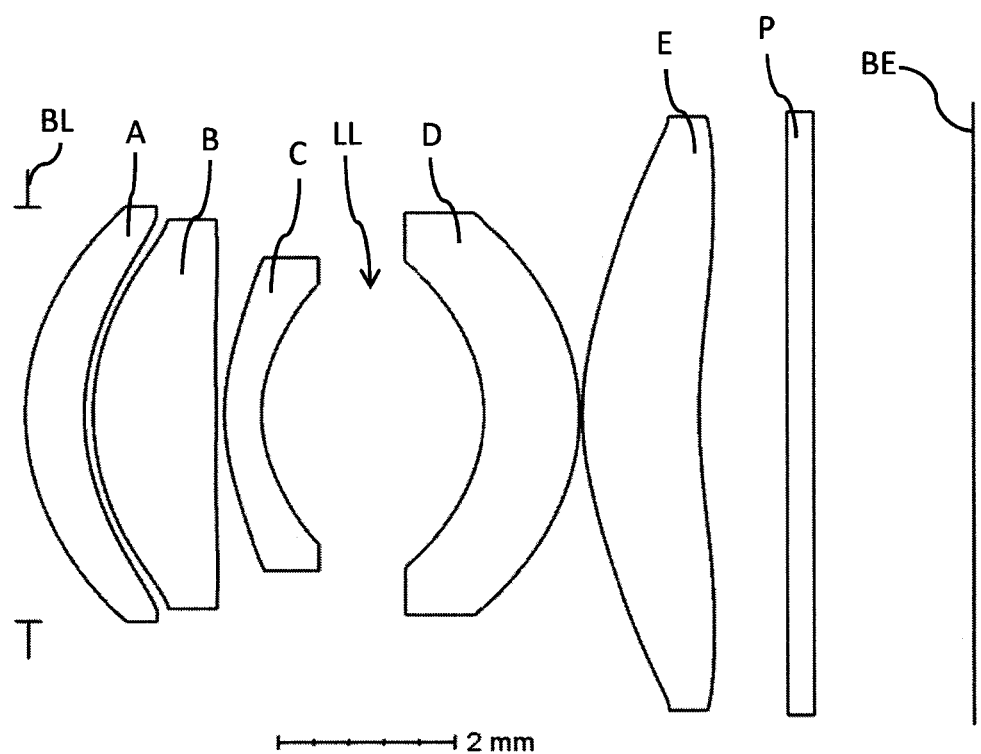
Figure 3B:
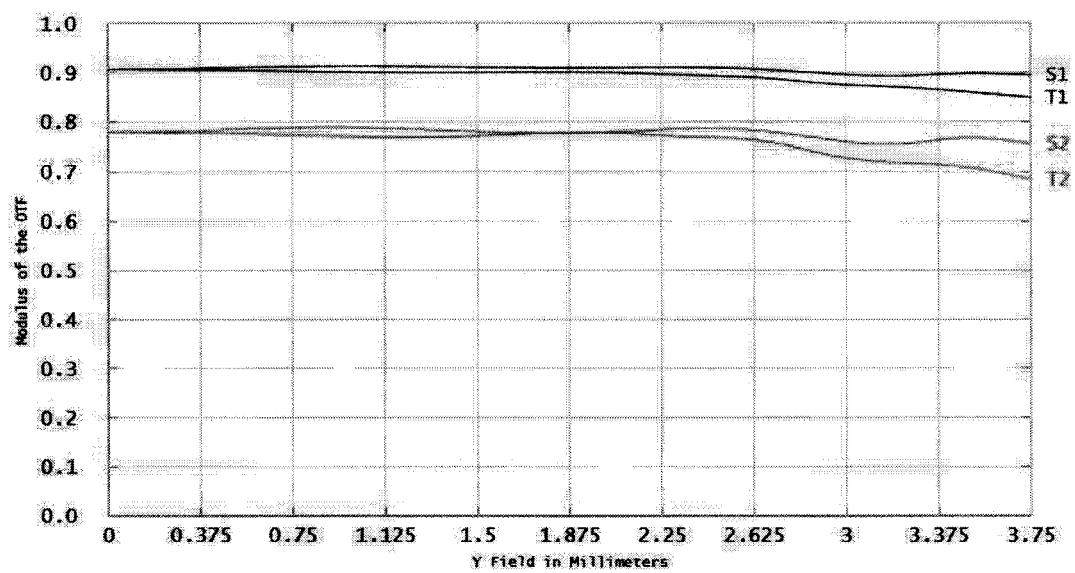
Figure 4A:
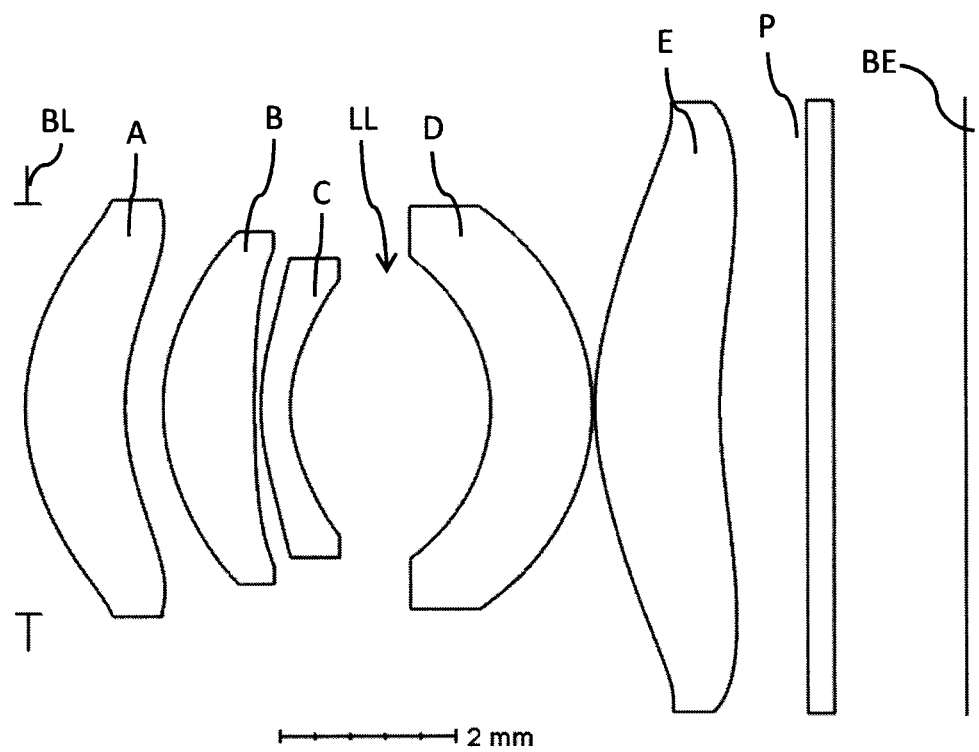
Figure 4B:
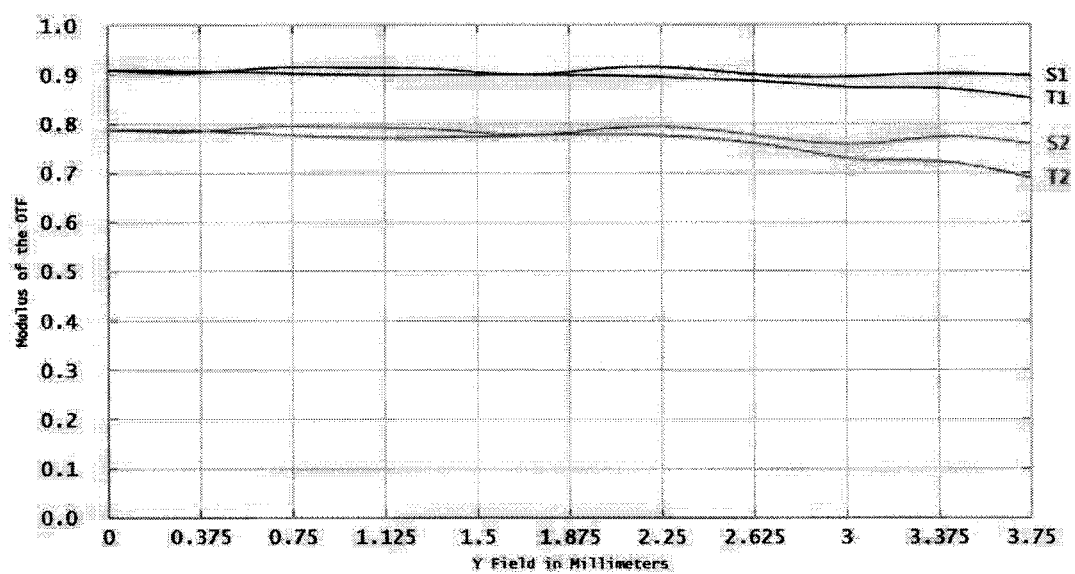
Figure 5A:
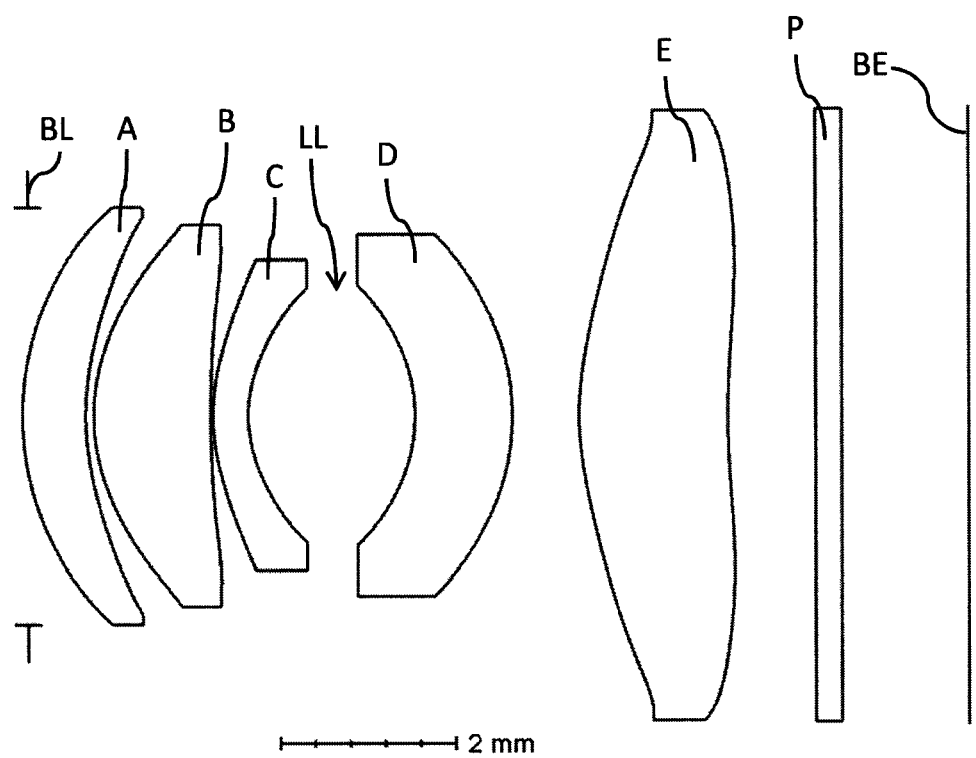
Figure 5B:
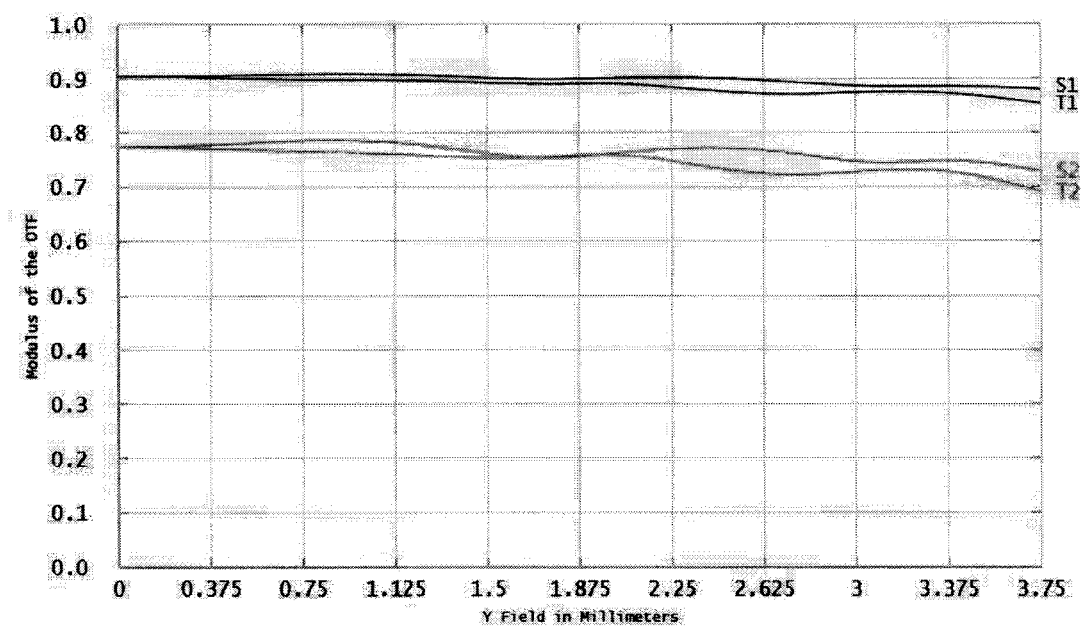
Figure 6A:
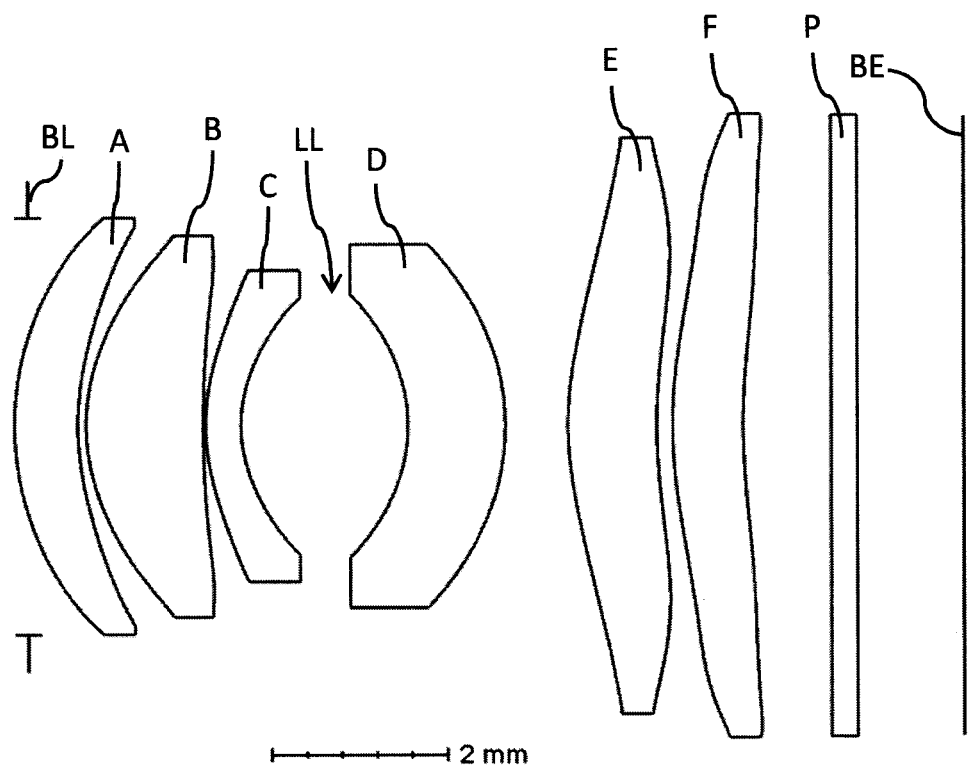
Figure 6B:
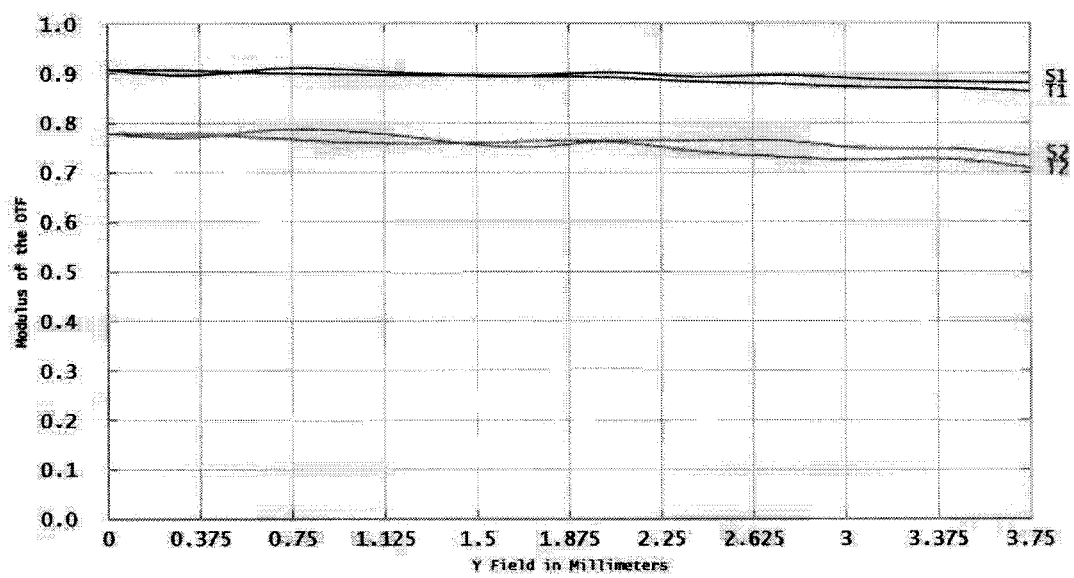
Figure 7A:
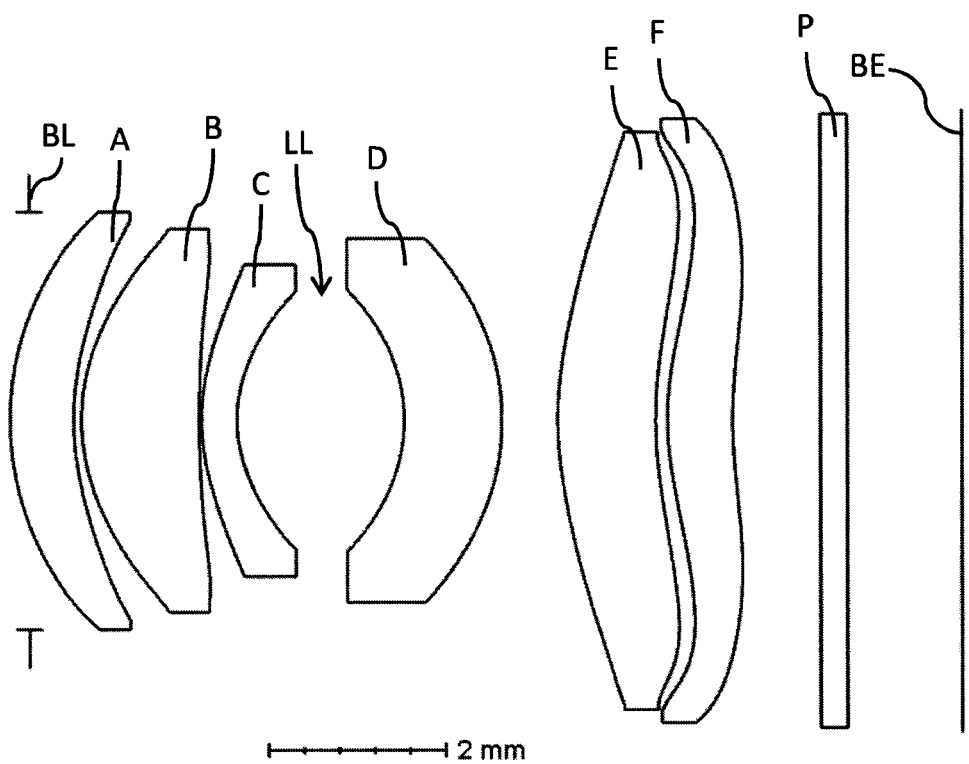
Figure 7B:
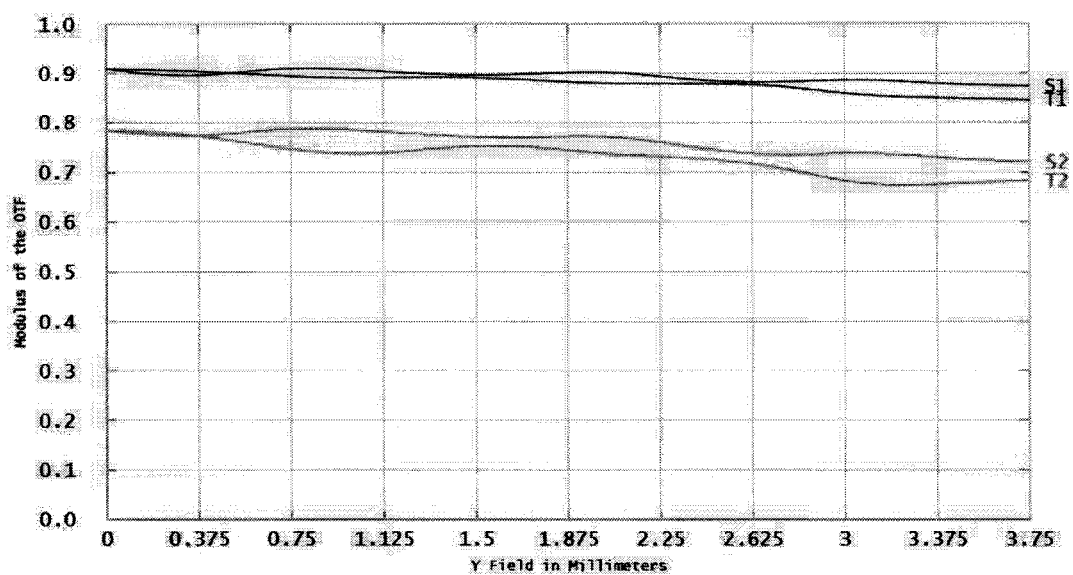
Figure 8A:
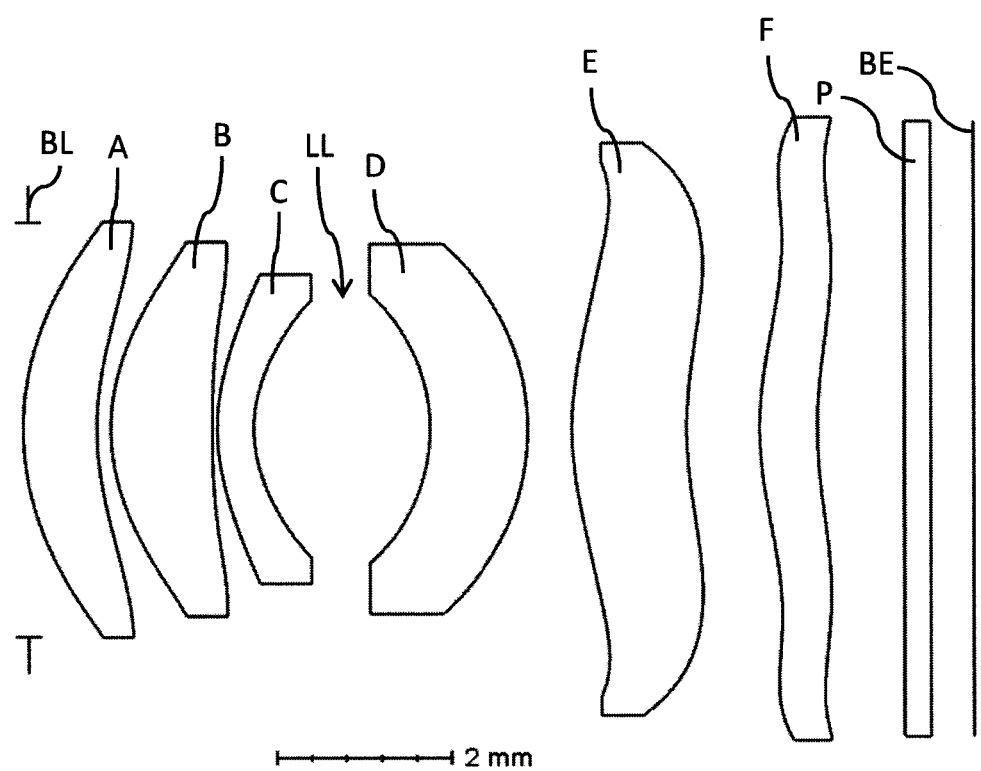
Figure 8B:
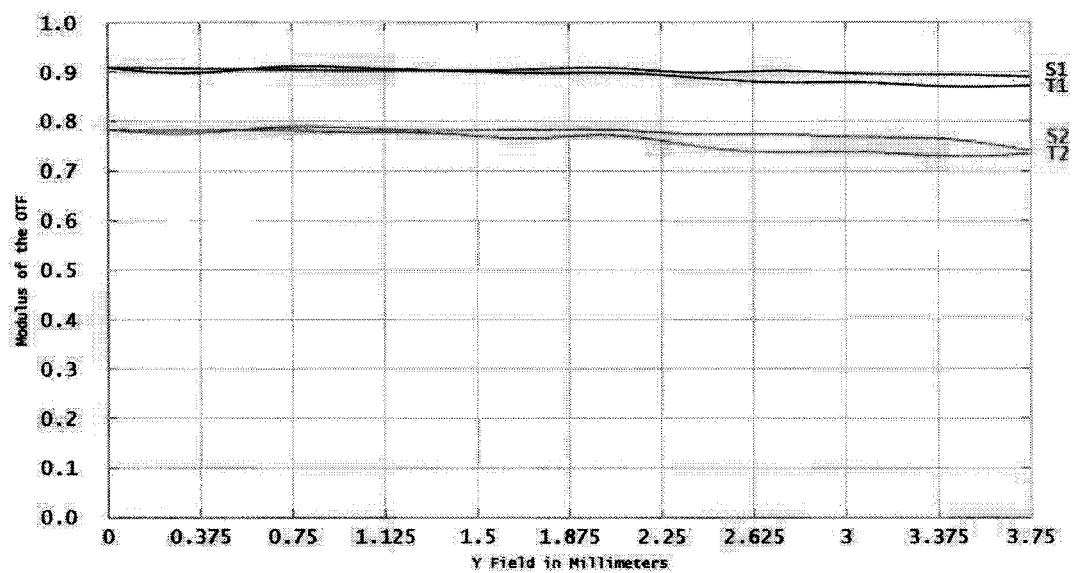

The diagram in accordance with FIG. 1b is associated with the first embodiment in accordance with FIG. 1a, the diagram in accordance with FIG. 2b is associated with the second embodiment in accordance with FIG. 2a and so on.

LIST OF REFERENCE NUMERALS

BL aperture diaphragm
G1-G4 first to fourth lens groups
A-F lens A to lens F
LL air lens
P plane parallel plate
BE image plane

The invention claimed is:

1. A photographic objective comprising, in a sequence from an object side end to an image side end, a first lens group having a positive refractivity with at least one lens, a second lens group having a negative refractivity with a single lens, a third lens group having a negative refractivity with a single lens and a fourth lens group having a positive refractivity with at least one lens,
wherein the lenses of the second and third lens groups each have a concave surface which face one another and define an air lens, wherein f1 is the overall focal length of the lenses of the second and third lens groups and f2 is the focal length of the air lens, and wherein the relationship 5.0≤f1/f2≤9.0 is true,
wherein the lenses of the second and the third lens groups have a refractive index larger than or equal to 1.6 and an Abbe-number larger than or equal to 19.

2. The photographic objective in accordance with claim 1, wherein the first lens group has a single lens or two lenses.
3. The photographic objective in accordance with claim 1, wherein the fourth lens group has a single lens or two lenses.
4. The photographic objective in accordance with claim 1, wherein the lenses of the first and the fourth lens groups have a refractive index larger than or equal to 1.53 and an Abbe-number larger than or equal to 55.
5. The photographic objective in accordance with claim 1, wherein each lens group has at least one aspheric surface.
6. The photographic objective in accordance with claim 5, wherein each lens has at least one aspheric surface.
7. The photographic objective in accordance with claim 5, wherein both surfaces are aspheric for at least one of the lenses.
8. The photographic objective in accordance with claim 5, wherein an aperture diaphragm is provided that is arranged in a region of a first aspheric surface when considered from the object side end.
9. The photographic objective in accordance with claim 1, wherein further at least one of the following relationships is true:

$$-6.0 \leq fB/f2 \leq -4.0;$$

$$5.0 \leq fC/f2 \leq 10.0;$$

$$-3.0 \leq f3/f1 \leq -1.6;$$

$$10.0 \leq fD/f2 \leq 30.0;$$

$$1.0 \leq fC/f1 \leq 1.6;$$

$$-1.2 \leq fB/f1 - 0.80;$$

$$2.6 \leq fD/f1 \leq 5.0;$$

wherein
fB is the focal length of the lens directly in front of the second lens group,
fC is the focal length of the lens of the second lens group,
fD is the focal length of the lens of the third lens group, and
f3 is the focal length of the fourth lens group.

10. The photographic objective in accordance with claim 1,
wherein further at least one of the following relationships is true:

$$0.585 \leq fB/f \leq 0.635;$$

$$-1.2 \leq fC/f3 \leq -0.5;$$

$$0.3 \leq fB/f3 \leq 0.7;$$

$$0.9 \leq f3/f \leq 2.5;$$

$$-3.0 \leq Fd/f3 \leq -1.3;$$

$$0.20 \leq fC/fD \leq 0.62;$$

$$-1.00 \leq fC/f \leq -0.70;$$

$$-1.0 \leq fB/fC \leq -0.60;$$

wherein
fB is the focal length of the lens directly in front of the second lens group,
fC is the focal length of the lens of the second lens group,
fD is the focal length of the lens of the third lens group,
f3 is the focal length of the fourth lens group, and
f is the overall focal length of the objective.

11. The photographic objective in accordance with claim 1,
wherein further the relationship $0.2 \leq d'/f \leq 0.4$ is true, wherein
d' is the thickness of the first lens group, and
f is the complete focal length of the objective.

12. A photographic objective comprising, in a sequence from an object side end to an image side end, a first lens group having a positive refractivity with at least one lens, a second lens group having a negative refractivity with a single lens, a third lens group having a negative refractivity with a single lens and a fourth lens group having a positive refractivity with at least one lens,
wherein the lenses of the second and third lens groups each have a concave surface which face one another and define an air lens, wherein f1 is the overall focal length of the lenses of the second and third lens groups and f2 is the focal length of the air lens, and
wherein the relationship $5.0 \leq f1/f2 \leq 9.0$ is true,
wherein further the relationships $-0.75 \leq f1/f \leq -0.55$ and $-0.2 \leq f2/f \leq 0.08$ are true,
wherein f is the overall focal length of the objective.

13. A photographic objective comprising, in a sequence from an object side end to an image side end, a first lens group having a positive refractivity with at least one lens, a second lens group having a negative refractivity with a single lens, a third lens group having a negative refractivity with a single lens and a fourth lens group having a positive refractivity with at least one lens,
wherein the lenses of the second and third lens groups each have a concave surface which face one another and define an air lens, wherein f1 is the overall focal length of the lenses of the second and third lens groups and f2 is the focal length of the air lens, and
wherein the relationship $5.0 \leq f1/f2 \leq 9.0$ is true,
wherein further the relationships $-3.00 \leq fD/f \leq -1.50$ and $-3.0 \leq fD/f3 \leq -1.30$ are true,
wherein:
fD is the focal length of the lens of the third lens group,
f3 is the focal length of the fourth lens group, and
f is the overall focal length of the objective.

14. A photographic objective comprising, in a sequence from an object side end to an image side end, a first lens group having a positive refractivity with at least one lens, a second lens group having a negative refractivity with a single lens, a third lens group having a negative refractivity with a single lens and a fourth lens group having a positive refractivity with at least one lens,
wherein the lenses of the second and third lens groups each have a concave surface which face one another and define an air lens, wherein f1 is the overall focal length of the lenses of the second and third lens groups and f2 is the focal length of the air lens, and
wherein the relationship $5.0 \leq f1/f2 \leq 9.0$ is true,
wherein further the relationships $-0.40 \leq fB/fD \leq -0.20$ and $-0.2 \leq f2/f \leq -0.08$ are true,
wherein:
fB is the focal length of the lens directly in front of the second lens group,
fD is the focal length of the lens of the third lens group, and
f is the overall focal length of the objective.

15. A photographic objective comprising, in a sequence from an object side end to an image side end, a first lens group having a positive refractivity with at least one lens, a second lens group having a negative refractivity with a single lens, a third lens group having a negative refractivity with a single lens and a fourth lens group having a positive refractivity with at least one lens,
wherein the lenses of the second and third lens groups each have a concave surface which face one another and define an air lens, wherein f1 is the overall focal length of the lenses of the second and third lens groups and f2 is the focal length of the air lens, and
wherein the relationship $5.0 \leq f1/f2 \leq 9.0$ is true,
wherein further the relationships $-15.0 \leq f3/f2 \leq -8.0$ and $-0.2 \leq f2/f \leq -0.08$ are true,
wherein:
f3 is the focal length of the fourth lens group,
f is the overall focal length of the objective.

* * * * *